Patented Dec. 14, 1948

2,456,452

UNITED STATES PATENT OFFICE 2,456,452

2-CHLOROINDONE

Nelson V. Seeger, Cuyahoga Falls, Ohio, assignor to Wingfoot Corporation, Akron, Ohio, a corporation of Delaware No Drawing. Application May 8, 1946,
Serial No. 668,309

3 Claims. (Cl. 260—590)

This invention relates to 2-chloroindone (2-chloroindenone) and to a method of preparing the same.

It has been discovered that chlorinated indone having a chlorine atom attached to the carbon atom in the alpha position to the carbonyl group may be produced by reacting benzene with alpha beta dichloroacrylyl chloride in the presence of a Friedel-Crafts catalyst. The reaction involved may be shown by structural formula as follows:

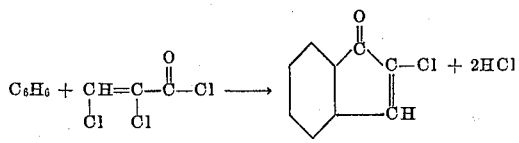

More specifically, 2-chloroindone may be prepared by reacting 164.5 parts of alpha beta dichloroacrylyl chloride, warmed to a temperature of 30° C., with 145 parts of aluminum chloride to form a solution, to which was added 100 parts of carbon disulfide together with 82.5 parts of benzene, which benzene was added slowly. After completion of the addition of the benzene, the reaction mixture was allowed to stand for 20 hours at a temperature of 46° C., after which the reaction mixture was quenched in ice water containing concentrated hydrochloric acid. The reaction mixture was stirred in the quench liquid to produce a precipitate which was filtered and then washed with benzene. The precipitate was then recrystallized from benzene, which precipitate was identified as 2-chloroindone having a melting point of 207–208° C.

The reaction between benzene and alpha beta dichloroacrylyl chloride to produce 2-chloroindone may be catalyzed with the usual Friedel-Crafts catalyst, such as aluminum chloride, ferric chloride, zinc chloride, stannous chloride, titanium chloride, and boron trifluoride. The usual inert solvents may be used in carrying out this reaction, including nitrobenzene as well as carbon disulfide, or one of the reactants may be used as the liquid medium, in which case an excess of one of the reactants will be employed.

The alpha beta dichloroacrylyl chloride may be produced in any of the well-known methods employed, as, for example, those methods disclosed in Beilstein Supplement, vol. 2, page 186, or Annalen, vol. 392, page 261.

The 2-chloroindone may be used as a monomer in the formation of plastic masses, which masses may be formed by heating 2-chloroindone in the presence of a peroxide catalyst, i. e., benzoyl peroxide, acetyl peroxide and ammonium persulfate, below the decomposition temperature of the monomer. Copolymers with 2-chloroindone may also be prepared using such copolymerizable monomers as the vinyl ketones, the vinyl esters, styrene, the vinyl ethers, acrylonitrile, the vinyl halides, the dienes, i. e., butadiene-1,3, vinyl acetylene, etc. The 2-chloroindone may also be used as an insecticide and is particularly useful as an insecticide when diluted with an inert carrier, as, for example, deodorized kerosene, etc. The 2-chloroindone may be used as an intermediate in the preparation of other chemical compounds in view of the exceptionally active chlorine atom.

Suitable changes may be made in the details of the process without departing from the spirit or scope of the present invention, the proper limits of which are defined in the appended claims.

I claim:

1. 2-chloroindone.
2. A method of preparing 2-chloroindone which comprises reacting benzene with alpha beta dichloroacrylyl chloride in the presence of a Friedel-Crafts catalyst.
3. A method of preparing 2-chloroindone which comprises reacting benzene with alpha beta dichloroacrylyl chloride in the presence of aluminum chloride.

NELSON V. SEEGER.

REFERENCES CITED

The following references are of record in the file of this patent:

UNITED STATES PATENTS

| Number | Name | Date |
|---|---|---|
| 1,754,031 | Mayer | Apr. 8, 1930 |

OTHER REFERENCES

Kohler, Am. Chem. Jour., vol. 42, pages 376, 380 (1909).

Kipping, Jour. Chem. Soc., London, vol. 65, page 500 (1894).